United States Patent [19]
Middendorf

[11] 3,906,826
[45] Sept. 23, 1975

[54] WORKPIECE INDEXING APPARATUS FOR MACHINE TOOLS

[75] Inventor: Roy M. Middendorf, Greensburg, Ind.

[73] Assignee: BMR Enterprises, Greensburg, Ind.

[22] Filed: Mar. 29, 1974

[21] Appl. No.: 456,075

[52] U.S. Cl. ............ 83/267; 83/411 R; 83/414; 83/733; 83/273; 408/71
[51] Int. Cl.² .................. B26D 7/06; B26F 1/40
[58] Field of Search .......... 83/411 R, 414, 733, 69, 83/267, 257, 273; 408/71, 49

[56] References Cited
UNITED STATES PATENTS

| | | | |
|---|---|---|---|
| 1,859,111 | 5/1932 | Rock | 408/71 |
| 1,942,927 | 1/1934 | Johnson et al. | 408/71 X |
| 2,033,686 | 3/1936 | Davis | 408/71 |
| 2,394,769 | 2/1946 | Heckethorn | 408/71 |
| 2,506,424 | 5/1950 | Jonke | 408/71 |
| 2,956,464 | 10/1960 | Charron | 83/411 R X |

*Primary Examiner*—Willie G. Abercrombie
*Attorney, Agent, or Firm*—Woodard, Weikart, Emhardt & Naughton

[57] ABSTRACT

The disclosed example includes a punch press having a horizontal tooling plate to be indexed through 180° to index work from a load station to a work station, and return it. Two racks and pinions and an actuator are combined with a suitable eccentric linkage to provide a high mechanical advantage of the actuator over the tooling plate at the start and finish of indexing, and a high speed therebetween.

10 Claims, 6 Drawing Figures

3,906,826

WORKPIECE INDEXING APPARATUS FOR MACHINE TOOLS

BACKGROUND OF THE INVENTION

1. Field of the Invention

This invention relates generally to workpiece holders for machine tools, and more particularly to an indexing method and apparatus for handling comparatively heavy loads with moderate power.

2. Description of the Prior Art

There are many times in manufacturing, when the work will be moved from one position to another in a machine. Frequently the movement is from a loading station to a work station where work is performed on the workpiece, and then the workpiece is returned to the loading station, or transferred to an unloading station, for removal from the machine.

Sometimes the movement is accomplished on a table and the table is indexed from a position where the work is loaded onto it, to a position where the work is moved into position adjacent a tool which is to perform operations on it. Various kinds of indexing devices are known but a problem which I have observed with many of them is a requirement of large amounts of power for high speed indexing, or a sacrifice in speed, or excessive wear and tear on the indexing apparatus. The invention disclosed herein was made in an effort to overcome one or more of these problems which I have noticed in existing equipment.

SUMMARY OF THE INVENTION

Described briefly, in a typical embodiment of the present invention, the indexing apparatus is comprised of a workpiece holder mounted to a base for rotation about an axis, an actuator coupled between the holder and the base and operable, when actuated, to rotate the holder, and coupling means between the holder and the actuator to provide a high mechanical advantage of the actuator over the holder both at the beginning and end of the rotation, and a comparatively high speed of rotation of the holder between the limits of rotation. For this purpose, it employs two racks and pinions, the first pinion driving an eccentric which drives the second rack which drives the work holder. The eccentric provides the desired type of mechanical advantage at the limits of indexing of the workpiece holder. The apparatus is illustrated in a form convenient for retrofitting to conventional punch presses.

DESCRIPTION OF THE PREFERRED EMBODIMENT

Figure 1:
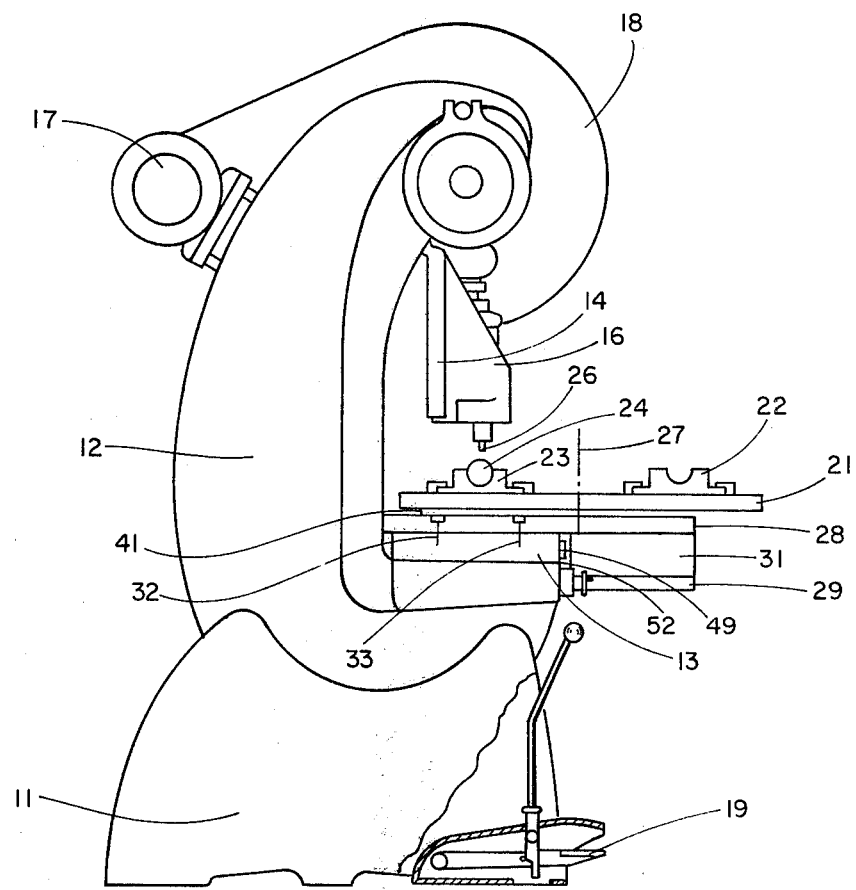
FIG. 1 is a side elevational view of a conventional punch press having the workpiece indexing apparatus mounted thereon according to one embodiment of this invention.

Referring now to the drawings in detail, and particularly FIG. 1, the punch press is shown having a base 11, C-shaped side frames 12, of which only one is shown, a bolster 13, parallel guideways 14 (of which only one is shown) for the ram 16, a drive motor 17, and fly wheel housing 18. An operating pedal is shown at 19. The parallel C-shaped side frames are affixed to the base, the bolster 13 is affixed to the side frames 12, and the ram 16 is drivable up and down by a suitable crank and connecting rod driven by the motor 17. All of this is conventional construction.

According to a typical embodiment of the present invention, the workpiece indexing apparatus as illustrated includes a work holder in the form of a table 21 having thereon a pair of fixtures 22 and 23, both of them clamped to the indexing table and one of them holding a workpiece 24 at the work station under the punching or dimpling tool 26 secured in the ram 16. The other fixture 22 is positioned at the loading station in front of the work station and amply spaced therefrom for the convenience and safety of the operator.

To move the fixture 22, when loaded with a workpiece, into the work station, and the fixture 23 with the work completed on the workpiece therein out to the unloading station, the tooling plate or index table 21 is rotated 180° about the axis 27. This is provided for in the components employed to mount the index table on the punch press. Such components include the indexing system mounting plate 28, the lower bearing plate 29, and the lower bearing plate side supports 31. The mounting plate 28 is bolted to the bolster 13. For this purpose, the same threads as are used to bolt the bolster to the side frames can be used but with longer bolts, or additional bolts can be threaded into the bolster after the drilling and tapping thereof, preferably two on each side. Bolt locations are indicated schematically at 32 and 33 in FIG. 1, for example. The side supports 31 are bolted to the underside of the mounting plate 28, and the lower bearing plate is bolted to the lower faces of the side supports 31.

Figure 2:
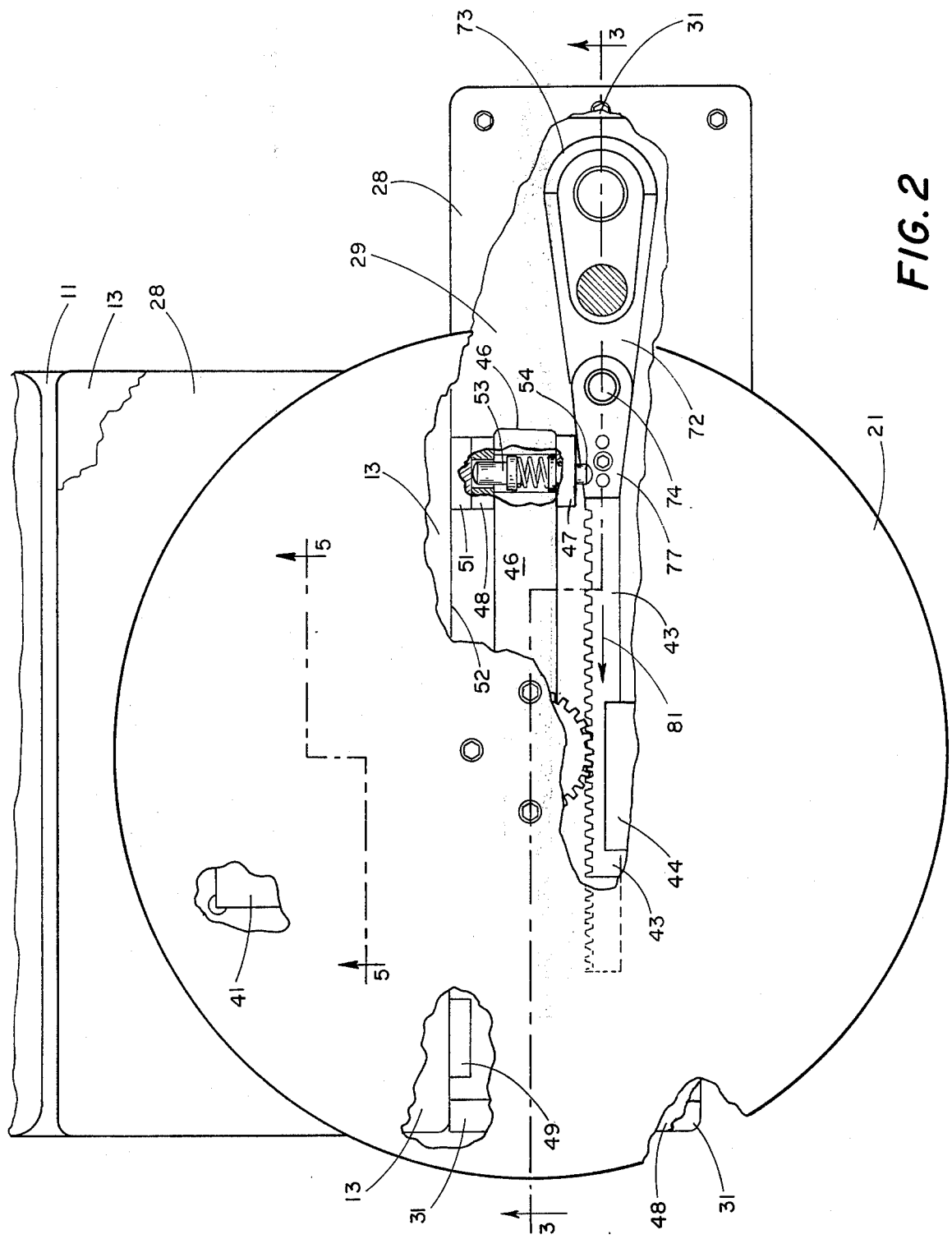
FIG. 2 is a top plan view, somewhat enlarged, omitting the workpiece holding fixtures themselves, and showing the index table and operating mechanism housing partially cut-away, to show interior working details.
Figure 3:
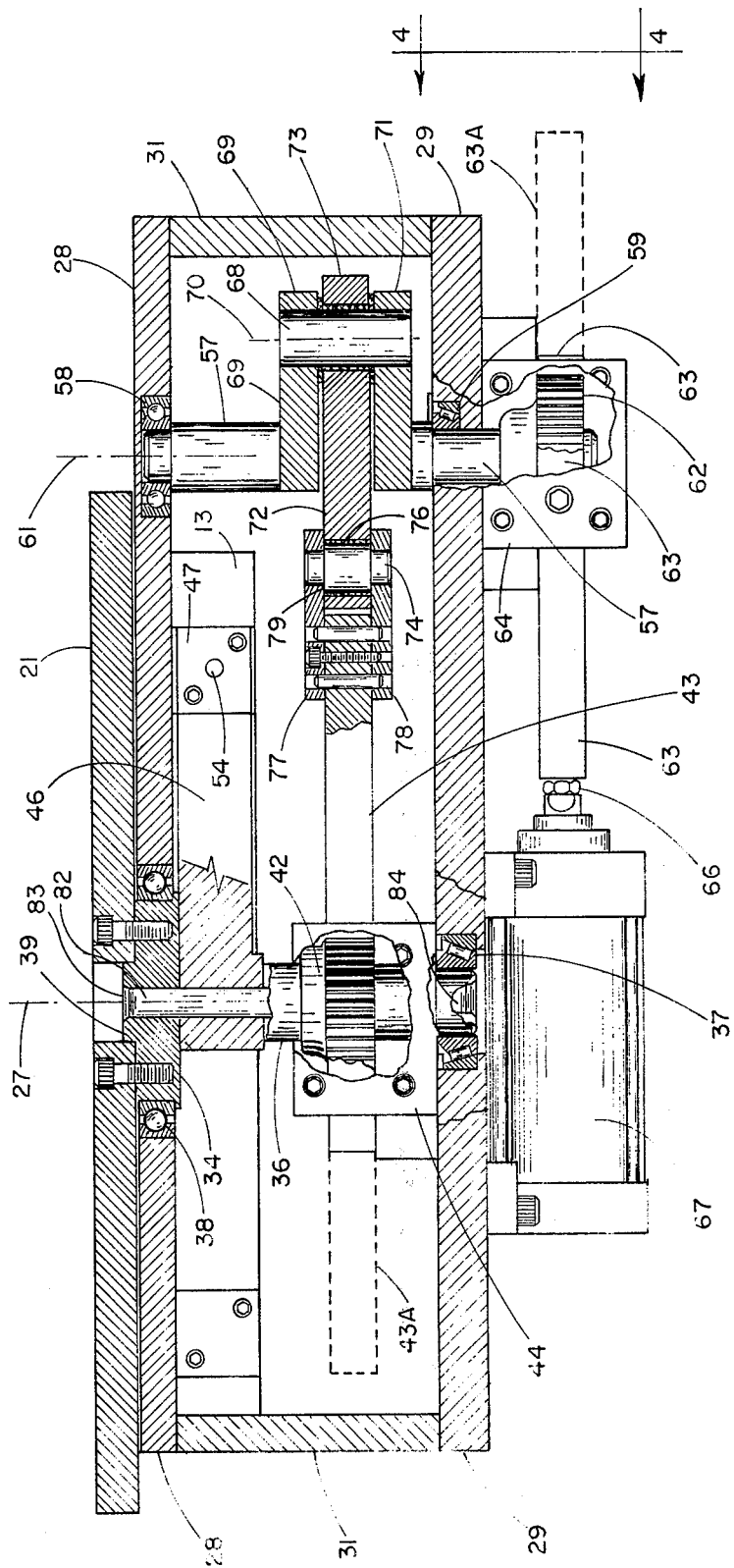
FIG. 3 is a section taken at line 3—3 in FIG. 2 and viewed in the direction of the arrows.
Figure 4:
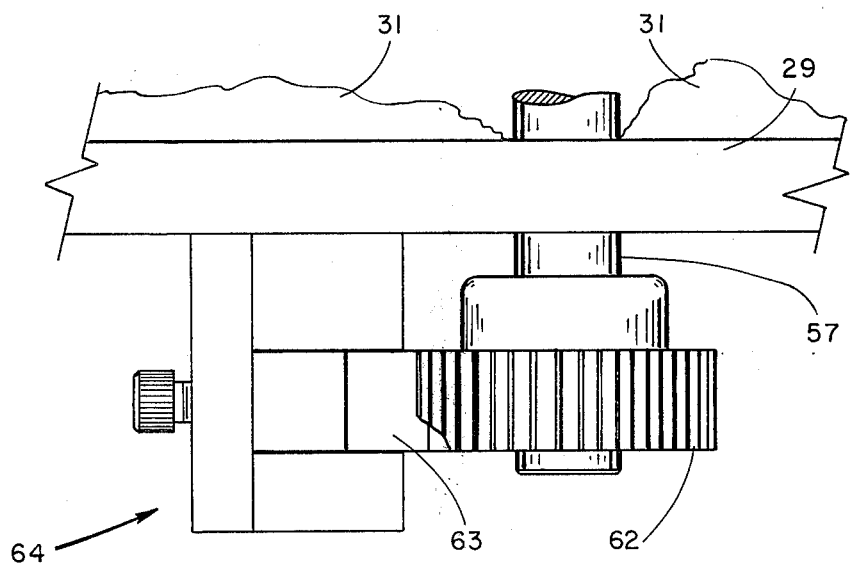
FIG. 4 is a fragmentary view taken at line 4—4 in FIG. 3 and viewed in the direction of the arrows.
Figure 5:
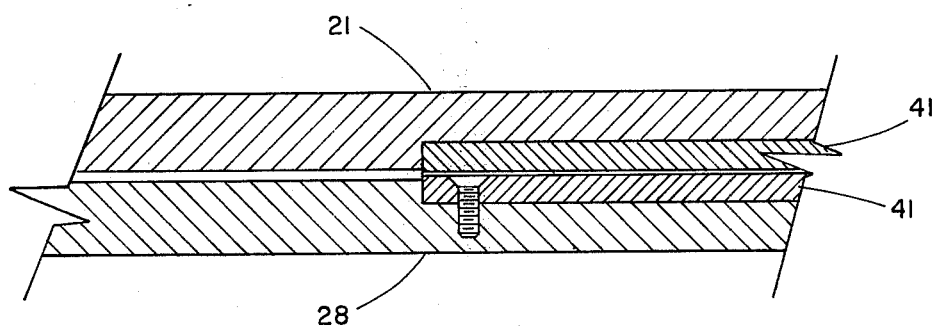
FIG. 5 is a section taken at line 5—5 in FIG. 2 and viewed in the direction of the arrows, and showing the wear plates between the index table and the index system mounting plate.
Figure 6:
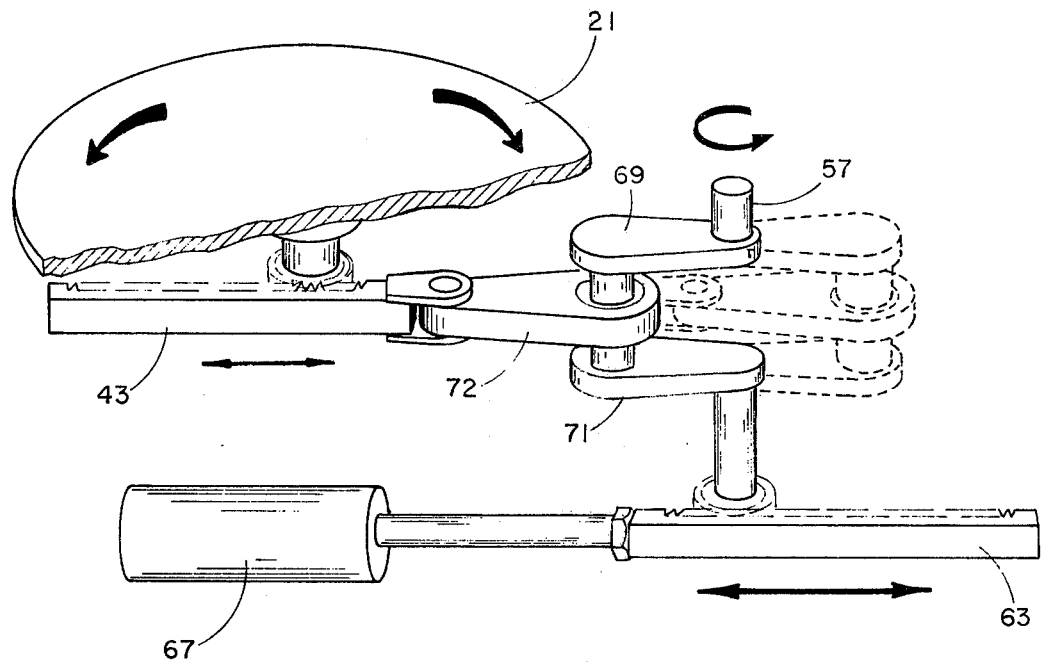
FIG. 6 is a schematic perspective view of the mechanism employed, showing the index table indexed 180°.

Now that the overall relationship of the index table and the mounting thereof to the punch press has been described, additional details can be appreciated by reference to FIGS. 2 through 4. The index table is bolted to a flange 34 at the upper end of the index table shaft 36, the lower end of which is supported in a tapered roller bearing assembly 37 mounted in the lower bearing plate 29. A ball bearing assembly 38 is employed for anti-friction precision centering of the upper end of the shaft 36 and the table is centered in the shaft by the center boss 39. For suitable support of the table under the loading of the ram during ram operation, bearing wear plate laminae may be provided at 41 (FIGS. 1, 2 and 5) between the index table and the top surface of the mounting plate 28, being secured in appropriate shallow recesses in the mounting plate 28 and index table 21 to avoid movement of the laminae after ram operation and during indexing of the table.

A table drive pinion 42 is keyed to shaft 36 and is engaged by the table drive gear rack 43. The rack is mounted in a guide assembly 44 and is movable therethrough from the position shown by the solid outline 43 to the position shown by the dotted outline 43A. Upon such linear movement of the rack, it drives the pinion, and thereby the index table through 180° about the axis 27. To stop motion of the table at 180°, an index table stop arm 46 is affixed to the shaft 36 and has stop blocks 47 and 48 (FIG. 2) thereon engageable respectively with stop blocks 49 and 51 which are affixed to the front edge 52 of the bolster 13 (FIGS. 1, 2, and 3). Shock absorber means are provided in the stop arm 46 and include spring loaded plungers 53 and 54 for engaging one or the other of the bolster-mounted stop blocks prior to engagement thereof by a corresponding one of the arm-mounted stop blocks.

A crankshaft 57 is mounted in an upper ball bearing assembly 48 and a lower roller bearing assembly 59 in the plates 28 and 29, respectively, for rotation about an axis 61 parallel to axis 27. The crankshaft has a crank drive pinion 62 keyed thereto which is engaged by the crank drive rack 63 supported in the rack guide assembly 64 secured to the plate 29. The left-hand end of crank drive rack 63 is connected by a coupling 66 to the piston rod of the hydraulic cylinder 67 which, for this example, may be a cylinder having approximately 3 and ½ inch bore and a 6 inch stroke. The cylinder is bolted to the bottom face of the bearing plate 29, as is the crank drive rack guide assembly 64.

A crank pin 68 is affixed to crankthrows 69 and 71 affixed to the crankshaft. The crankshaft, crankthrows and crankpin are shown as a single weldment. Connecting rod 72 is mounted to the crank pin 68 and retained thereon by the bearing cap 73 bolted to the connecting rod. A wrist pin 74 is received in a bearing 76 at the end of the connecting rod opposite the crank pin. A pair of connector plates 77 and 78 is secured to the upper and lower faces of the table drive rack 43, and the wrist pin is located and retained in position between these plates, by the shoulders 79, for example on the wrist pin.

In operation, with the piston rod retracted, the table is in one position, such as shown in FIG. 1, for example. When hydraulic fluid is applied to one end of the cylinder 67, the piston rod is driven outward to drive the crank drive rack 63 outward to the position shown by the dotted outline 63A. In so doing, the crankshaft is driven 180° which, through the connecting rod, drives the table drive rack to the left to the position shown by the dotted outline 43A. This rotates the index table 180° whereupon it is stopped by abutting engagement of the stop block 47 on the index table stop arm 46 with the stop block 49 on the front of the bolster. This operation moves fixture 23 from the work position shown in FIG. 1 to the load-unload station where the fixture 22 is located in FIG. 1. At the same time, the fixture 22 moves to the work station. Accordingly, the diametrically opposed fixtures alternate position as the hydraulic cylinder is actuated to extend the piston rod. When the pressure is reversed in the double acting cylinder, the rod is retracted, to return the crank drive rack 63 to the original starting position, whereupon the fixture 23 is returned to the work station shown in FIG. 1.

This operation is accomplished readily by a comparatively small power, even though the inertia may be large, because of the arrangement of the components according to this invention wherein the mechanical advantage of the cylinder assembly at the start of the stroke is very high due to the relationship of the eccentric to the line of action of the table drive rack. Midway through the 180° indexing, the mechanical advantage is comparatively low, but the speed is high. Then, as the piston nears the end of the stroke, the table should be slowing down and indeed it will, because the connecting rod will be nearing the limit of its travel as the crank pin has moved around toward an in-line condition of the crank pin axis 70 with the crankshaft axis and the line of action 81 (FIG. 2) of the table drive rack 43. Accordingly, the present invention is adapted to high speed indexing of comparatively large masses. Therefore it is useful not only on punch presses as in the example shown, but on much larger equipment.

An air supply hole 82 is provided through the center pivot shaft 36 and tapped on both ends at 83 and 84 for providing a power supply of air clamping of the piece part in a workpiece holding fixture or nest such as 22 or 23. Due to the reciprocating action of the system, it is also possible to run electrical wires through this center hole instead of air, giving the option of using electrical components on the indexing locators. For example, it would be possible to hold and locate a piece part with an electro-magnetic nest.

A combination of two limit switches, one for each index position can be electrically interlocked to the machine function to provide a positive synchronization with the machine function.

Some of the advantages of the invention are as follows:

1. It helps to comply with OSHA safety standards by eliminating the need of the machine operator to place his hands under or near the particular machine operation.

2. It can be guarded very easily to eliminate any pinch points.

3. A substantial increase in production can be realized with this unit due to the option of the operator being able to load and unload the piece part during the machine cycle time.

4. It can be installed in an existing hydraulic press or a mechanical punch press, with or without an air cushion or undermotion, as easily as changing a bolster plate. By making appropriate electrical connections between the press and the indexing unit, they can be safely interlocked.

5. It can be used on most operations where it is advantageous for the operator to load and unload during the machine cycle time. Besides hydraulic and mechanical press operations it can be used on drilling, tapping, milling, resistance welding, mig & tig welding, riveting and several types of assembly operations.

6. The crankshaft type of index provides for a slow start, rapid index, and again slows down as it engages the precision stop. A self contained shock absorber is engaged just prior to final location of the index cycle. Wear in any area of this unit has no effect on the final precise location.

7. The main indexing unit can remain in the machine tool when changing from one piece part to another. The only change over would be the changing of the locating nests.

8. In many cases the piece part can be loaded and unloaded automatically in this system.

9. In a press operation several options are available to the user, such as indexing the bottom half of a die out to the operator to load, then index the die under the ram for the stamping operation and then return the die back to the operator to unload. In simple dies, two bottom halves could be used to increase production. Another option could be that the die remains under the ram and the piece part is carried in and out of the die on two draw pads, strippers, or either air or magnetically clamped locators.

10. A substantial savings can be realized in tooling costs by replacing some multi-station dial units with this two station system.

11. It can be easily maintained by maintenance people. A one shot lubricating system is optional.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. A workpiece handling apparatus comprising:
   a workpiece holder mounted to a base for rotation about an axis;
   an actuator coupled between said holder and said base and operable when actuated to rotate said holder;
   and coupling means coupled between said holder and said actuator to provide a high mechanical advantage of said actuator over said holder at the beginning and end of the motion of said holder caused by said actuator;
   said coupling means including first and second gear racks and first and second pinions, said first rack being connected to said actuator and linearly operable thereby, said first pinion being engaged by said first rack for rotation thereby upon linear movement of said first rack, eccentric drive means connected to said first pinion for rotation by said pinion in response to rotation of said first pinion by said first rack, said second rack being coupled to said eccentric and drivable by said eccentric as said actuator drives said first pinion, said second pinion being coupled to said holder and engaged by said second rack and said holder being rotatable by said second pinion as said second pinion is rotated by said second rack whereby said holder is rotated about said axis.

2. The apparatus of claim 1 wherein:
   said eccentric is a crankshaft.

3. The apparatus of claim 1 and further comprising:
   guide means mounted to said base and guidingly engaging said second rack;
   said coupling means including a connecting rod connected to said eccentric and to said second rack to impart reciprocating motion to said second rack in response to rotational motion of said first pinion in response to reciprocating motion of said first rack.

4. The apparatus of claim 1 wherein:
   said actuator is a fluid powered linear actuator.

5. The apparatus of claim 1 and further comprising:
   a machine tool having a work performing head movable toward and away from said holder.

6. The apparatus of claim 5 wherein:
   said machine tool includes guide means for guiding said head in a direction parallel to said axis, toward a work station attainable by said holder during rotation about said axis,
   said machine tool having a loading station located 180° about said axis with respect to said work station;
   and said holder having stops thereon arranged for cooperation with stop means on said machine tool for stopping rotation of said holder at the extremes of rotation through 180° for said actuator to move a point on said holder from said loading station to said work station, and back to said loading station in response to actuation of said actuator in opposite directions.

7. The apparatus of claim 6 wherein:
   said machine tool is a press having a bolster;
   and said base includes means affixed to said bolster.

8. The apparatus of claim 7 wherein:
   said means affixed to said bolster include a mechanism support plate fastened on the top of said bolster.

9. The apparatus of claim 8 wherein:
   said base includes a lower bearing support plate and a support member secured between said mechanism support plate and said bearing support plate;
   and said workpiece holder being a table located above said mechanism support plate.

10. The apparatus of claim 9 wherein:
    said eccentric is a crankshaft, and said coupling means include a connecting rod between said plates and connected to said crankshaft and to said second rack to impart reciprocating motion to said second rack in response to rotational motion of said first pinion in response to reciprocating action imparted to said first rack by said actuator.

* * * * *